(12) United States Patent
Bunker et al.

(10) Patent No.: US 8,881,272 B2
(45) Date of Patent: Nov. 4, 2014

(54) SYSTEM AND METHOD FOR SELECTING AND APPLYING FILTERS FOR INTRUSION PROTECTION SYSTEM WITHIN A VULNERABILITY MANAGEMENT SYSTEM

(75) Inventors: Eva Bunker, Richardson, TX (US); Nelson Bunker, Plano, TX (US); Kevin Mitchell, Richardson, TX (US); David Harris, Dallas, TX (US)

(73) Assignee: Achilles Guard, Inc., Dallas, TX (US)

( * ) Notice: Subject to any disclaimer, the term of this patent is extended or adjusted under 35 U.S.C. 154(b) by 620 days.

(21) Appl. No.: 12/726,492

(22) Filed: Mar. 18, 2010

(65) Prior Publication Data
US 2010/0242114 A1 Sep. 23, 2010

Related U.S. Application Data

(60) Provisional application No. 61/161,869, filed on Mar. 20, 2009.

(51) Int. Cl.
*G06F 21/56* (2013.01)
*H04L 29/06* (2006.01)
*G06F 21/57* (2013.01)

(52) U.S. Cl.
CPC .............. *H04L 63/20* (2013.01); *G06F 21/577* (2013.01); *Y10S 707/957* (2013.01); *Y10S 707/959* (2013.01)
USPC ................. 726/22; 726/11; 726/12; 726/113; 726/14; 726/15; 726/25; 726/23; 726/24; 726/26; 709/223; 709/224; 709/225; 709/226; 709/227; 709/228; 709/229; 707/957; 707/959; 713/176

(58) Field of Classification Search
CPC ............ H04L 63/1433; H04L 63/1416; H04L 2463/141; H04L 41/28; H04L 63/1441; H04L 63/20; H04L 12/2602; H04L 41/147; H04L 41/20; H04L 41/22; H04L 43/00; H04L 43/045; H04L 43/06; H04L 43/16; H04L 43/026; H04L 63/0227; H04L 63/0263; H04L 63/1425; G06F 21/577; G06F 21/55; G06F 21/85; G06F 11/30; G06F 21/552
USPC .................. 726/11–15, 22–26; 709/223–229; 707/957, 959; 713/176
See application file for complete search history.

(56) References Cited

U.S. PATENT DOCUMENTS

| | | | |
|---|---|---|---|
| 5,892,903 A * | 4/1999 | Klaus ............................... | 726/25 |
| 6,282,546 B1 * | 8/2001 | Gleichauf et al. ............... | 726/25 |
| 2004/0073800 A1 * | 4/2004 | Shah et al. ...................... | 713/176 |

* cited by examiner

*Primary Examiner* — Thanhnga B Truong
(74) *Attorney, Agent, or Firm* — David H. Judson

(57) ABSTRACT

A system for controlling selection of filters for protecting against vulnerabilities of a computer network includes a vulnerability management system analyzes the computer network and determines network vulnerabilities for the computer network. The vulnerability management system is configured to receive real-time data on a status of filters protecting against vulnerabilities of the computer network. A database contains a pre-generated mapping of network vulnerabilities to filters for protecting against the network vulnerabilities. The vulnerability management system enables user control of filters for protecting against vulnerabilities of the computer network based upon the determined network vulnerabilities of the computer network, the pre-generated mapping of network vulnerabilities to the filters for protecting against the network vulnerabilities and the real-time data on the status of the filters.

18 Claims, 15 Drawing Sheets

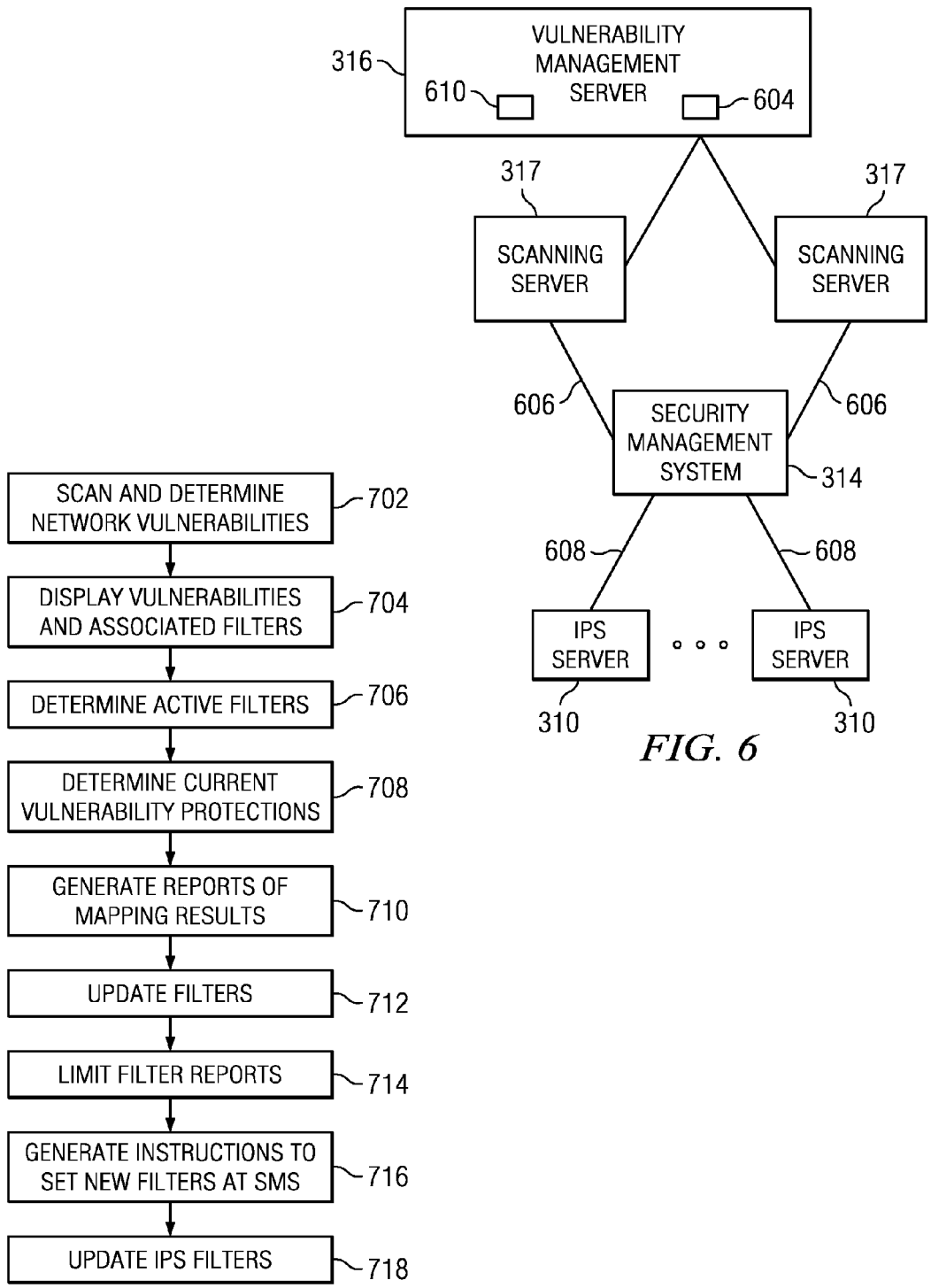

| Home | CEM | Jobs Manager | Reports | Filters Manager | Remediation Manager | Compliance | Research |
|---|---|---|---|---|---|---|---|

Vulnerability Reports | Filter Reports

Enterprise Vulnerability Manager — Fiction Inc. | 10:32 AM | Welcome, Elmae Burnett | My Account | Help | Logoff

| CEM | | 802 | 804 — Connection Configuration | Mitigated Risks | Active Risk Coverage | Active Risk Analysis |

Mitigated Risks for Profile: *Custom Profile* at *Fiction Inc.* and below. — 806

Fiction Inc. 808 — ⦿ Show results for this node and below. 812 — ◯ Show results for this node only.

| Custom Profile ▾ | Search full or partial Exposure name. | Exposure Name ▾ | 🔍 ✕ | View | Filters | Export |

| | | Risk Factor ▾ | PCI Severity | Exposure | Filtered |
|---|---|---|---|---|---|
| | ☐ | | | | 824 |
| ⊞ | ☐ | ⦿ High | Urgent | MS01-026 – IIS Remote Command Execution – UNICODE – (Superfluous Decoding) – (KB293826) | 1 |
| ⊞ | ☐ | ⦿ High | Urgent | MS03-007 – Microsoft Windows, Buffer Overflow in 'ntdll.dll' Functions – (KB815021) | 0 |
| ⊞ | ☐ | ⦿ High | Urgent | MS03-026 – Microsoft Windows – RPC Interface – Buffer Overflow – (KB823980) | 0 |
| ⊞ | ☐ | ⦿ High | Urgent | MS03-027 – Windows XP Shell – Buffer Overflow – (KB821557) | 0 |
| ⊞ | ☐ | ⦿ High | Urgent | MS03-044 – Buffer Overrun in Windows HSC Could Lead to System Compromise (825119) | 1 |
| ⊞ | ☐ | ⦿ High | Urgent | MS03-051 – Buffer Overflow in Microsoft FrontPage Server Extensions 2000 – (KB813360) | 1 |
| ⊞ | ☐ | ⦿ High | Urgent | MS03-051 – SmartHTML Interpreter Vulnerability – FrontPage Server Extensions 2000 – (KB813360) | 4 |
| ⊞ | ☐ | ⦿ High | Urgent | MS04-006 – Windows Internet Naming Service (WINS) – Denial of Service – (KB830352) | 0 |
| ⊞ | ☐ | ⦿ High | Urgent | MS04-012 – Cumulative Update for Microsoft RPC-DCOM – (KB828741) | 0 |
| ⊞ | ☐ | ⦿ High | Urgent | MS04-014 – Microsoft Jet Database Engine – Code Execution – (KB837001) | 0 |
| ⊞ | ☐ | ⦿ High | Urgent | MS05-026 – Vulnerability in HTML Help Could Allow Remote Code Execution – (KB896358) | 0 |
| ⊞ | ☐ | ⦿ Warning | Low | DNS Server is Running | 1 |

814 816 818 820 822

810

Fiction Inc.
├─ Claims Processing Division
├─ DMZ
├─ Financial Services Division
├─ Regional Offices
└─ Manual Scan

*FIG. 8*

| Home | CEM | Jobs Manager | Reports | Filters Manager | Remediation Manager | Compliance | Research |
|---|---|---|---|---|---|---|---|

Vulnerability Reports | Filter Reports

Enterprise Vulnerability Manager — Fiction Inc. | 11:26 AM | Welcome, Elmae Burnett | My Account | Help | Logoff

| | | | Connection Configuration | Mitigated Risks | Active Risk Coverage | Active Risk Analysis ~1002 |

- Fiction Inc.
  - Claims Processing Division
  - DMZ ~1004
  - Financial Services Division
    - Corporate Office
    - ERP Systems
    - Critical Production Run
    - Desktops
    - PCI Servers
    - Regional Offices
    - Manual Scan With TippingPoint filters | Without TippingPoint Filters ~1010

Active Risk Analysis for Profile: *Custom Profile* at *Fiction Inc.* and below
● Show results for this node and below.  ○ Show results for this node only.

Custom Profile ▼ ~1006 | Search full or partial Exposure name. | Exposure Name ▼ 🔍 ✕ | View | Filters | Export 1029 — Apply Scan Filters for selected items.
1027 — Apply Scan Filters for all items.

163 Exposures

| | Risk Factor ▼ | PCI Severity | | Total |
|---|---|---|---|---|
| ⊞ ◐ ☐ | High | Urgent | Dangerous Remote Procedure Call Service Present - ttdbserver | 1 |
| ⊞ ◐ ☐ | High | Urgent | Microsoft - FrontPage IIS - Cross Site Scripting shtml.dll Vulnerability | 2 |
| ⊞ ◐ ☐ | High | Urgent | Microsoft - IIS - HTR ISAPI Extension Buffer Overflow Issue | 3 |
| ⊞ ◐ ☐ | High | Critical | Microsoft - IIS and PWS - Extended Unicode - Directory Traversal Issue | 3 |
| ⊞ ◐ ☐ | High | Critical | Microsoft - Internet Information Server - Hit Highlighting - Authentication Bypass Issue | 3 |
| ⊞ ◐ ☐ | High | Urgent | Microsoft - IIS - Cross Site Scripting via Malformed IDC File Request | 1 |
| ⊞ ○ ☐ | High | Urgent | MS00-060 - IIS - Cross-Site Scripting - (KB260347) | 3 |
| ⊞ ◉ ☑ | High | Urgent | MS00-078 - Remote Command Execution through a Web Browser - UNICODE Directory Traversal - (KB276489) | 23 |
| ⊞ ◉ ☐ | High | Urgent | MS01-026 - IIS Remote Command Execution - UNICODE - (Superfluous Decoding) - (KB293826) | 5 |
| ⊞ ◉ ☐ | High | Urgent | MS01-033 - IIS 5.0 Remote Attackers - SYSTEM Privileges - Buffer Overflow IDQ (Q300972) | 9 |

| Home | CEM | Jobs Manager | Reports | Filters Manager | Remediation Manager | Compliance | Research |

Vulnerability Reports | Filter Reports

Enterprise Vulnerability Manager     Fiction Inc. | 10:29 AM | Welcome, Elmae Burnett! | My Account | Help | Logoff

| Connection Configuration | Mitigated Risks | Active Risk Coverage | Active Risk Analysis |

- CEM
  - Fiction Inc. 1004
    - Claims Processing Division
    - DMZ
    - Financial Services Division
    - Regional Offices
    - Manual Scan With TippingPoint filters | Without TippingPoint Filters — 1010

Active Risk Analysis for *Fiction Inc.* and below — 1006
- Show results for this node and below.   ○ Show results for this node only.

Search full or partial Exposure name. | Exposure Name ▽ | 🔍 ✕ | Export

168 Exposures                                                       Page: 1 2 3 4 5 6 7 8 9

| Risk Factor ▼ | PCI Severity | | Total |
|---|---|---|---|
| ⊞ High | Critical | Apache – mod_proxy_balancer 'Multiple Issues | 1 |
| ⊞ High | Urgent | Apache 1.3 – mod_proxy HTTP Chunked Encoding Integer Overflow Issue | 5 |
| ⊞ High | Urgent | Bind – DNS Stub Resolver – Buffer Overflow | 2 |
| ⊞ High | Critical | Dangerous Proxy Method Allowed – CONNECT | 1 |
| ⊞ High | Critical | ISC – BIND 9 – Remote Cache Poisoning Issue | 2 |
| ⊞ High | Urgent | Login Found with Known Default Credentials | 2 |
| ⊞ High | Urgent | MD5 – Message Digest Algorithm Hash Collision Weakness | 2 |
| ⊞ High | Critical | MS01-037 – Microsoft Windows 2000, Improper Authentication allowed by SMTP Service – (KB302755) | 4 |
| ⊞ High | Urgent | MS01-044 – Microsoft IIS Server, Buffer Overrun in SSI Directive Code – (KB297860) | 3 |
| ⊞ High | Critical | MS01-044 – Microsoft IIS, Privilege Elevation via In-Process Table – (KB297860) | 3 |
| ⊞ High | Critical | MS02-011 – SMTP Authentication Flaw Allows Unauthorized Relay – (KB313450) | 4 |
| ⊞ High | Urgent | MS02-018 – Microsoft IIS, Buffer Overflow in HTTP Header Field Delimiter – (KB319733) | 1 |
| ⊞ High | Urgent | MS06-002 – Embedded Web Fonts – Remote Code Execution (KB908519) | 2 |

SYSTEM AND METHOD FOR SELECTING AND APPLYING FILTERS FOR INTRUSION PROTECTION SYSTEM WITHIN A VULNERABILITY MANAGEMENT SYSTEM

CROSS-REFERENCE TO RELATED APPLICATIONS

This application claims the benefit of U.S. Provisional Application for Patent Ser. No. 61/161,869, filed on Mar. 20, 2009, and entitled "HOLISTIC VULNERABILITY MANAGEMENT SYSTEM," the specification of which is incorporated herein by reference.

TECHNICAL FIELD

The present invention relates to a vulnerability management system that extends risk management capabilities by implementing counter measure intelligence from a threat detection system that monitors for and prevent selected intrusions to a network, and more particularly to a method for utilizing the system vulnerabilities detected by a vulnerability management system to determine and apply appropriate filters/signatures within the threat detection system to mitigate malicious attacks and document controls for compliance.

BACKGROUND

Known security vulnerabilities present the greatest electronic security risk now confronting network organizations. Such vulnerabilities must be guarded against in order for enterprises to secure their networks to meet regulatory and business requirements. Existing protection for network organizations include the use of intrusion detection systems which detect attempted intrusions into the network environment and notify the organization of the attempted intrusion such that counteractive measures may be taken. Other types of systems involve intrusion protection systems which not only detect the attempted intrusions, but act in a proactive manner to eliminate the threat. Network vulnerabilities, as well as the frequency and sophistication of network attacks, are substantial and growing. Piecemeal protection processes such as random audits, scanners and consulting engagements have been utilized, but such processes leave an organization exposed for a high level of risk and typically fail to demonstrate a high level of business and regulatory compliance. These methods sometimes fail because they do not allow security to be imbedded as an ongoing operational process; they do not scale especially against the backdrop of a very complex and dynamic organization. Many of today's organizations are computing "ecosystems" created to serve multiple entities that are operationally independent or semi-independent while being interconnected from a computing network perspective. Even though these entities are managed autonomously, their networks must be collectively secured in a coherent process covering the entire computing system. In addition to this, organizations now rely upon information and communication technology to such an extent that a serious breach of security could likely have serious adverse business consequences, such as the loss of important data or, more likely, theft or publication of confidential information. Hacker's activities have the consequence of dramatically increasing network vulnerabilities. Sarbanes-Oxley, Gramm-Leach Bliley, HIPAA, and homeland security have all dramatically increased the level of security that organizations are required by law to maintain.

One reason that approaches such as intrusion protection systems and intrusion detection systems have not proven efficient for today's computing ecosystems enterprises is due to the fact that the filters/signatures implemented by such systems require intensive manual tuning and a good knowledge of the enterprise vulnerabilities landscape. Most enterprises tune their IPS (Intrusion Protection System) based on the vendor recommendation and some knowledge of their networks. What they should do is tune their IPS based on the vulnerabilities landscape of their enterprises. Organizations today are complex and distributed with unique business risk priorities that are hard to convey even within internal groups. Thus, what is clearly needed is some manner for integrating the vulnerabilities of a particular system or network with the filtering abilities of an associated intrusion protection system or other threat protection system that can be easily implemented, maintained and measured across a large-scale distributed ecosystem environment.

SUMMARY

The present invention as disclosed and described herein in one aspect thereof comprises a system for controlling selection of filters for protecting against vulnerabilities of a computer network. A vulnerability management system analyzes the computer network and determines network vulnerabilities for the computer network. The vulnerability management system is configured to receive real-time data on a status of filters protecting against vulnerabilities of the computer network. A database contains a pre-generated mapping of network vulnerabilities to filters for protecting against the network vulnerabilities. The vulnerability management system enables user control of filters for protecting against vulnerabilities of the computer network based upon the determined network vulnerabilities of the computer network, the pre-generated mapping of network vulnerabilities to the filters for protecting against the network vulnerabilities and the real-time data on the status of the filters.

BRIEF DESCRIPTION OF THE DRAWINGS

For a more complete understanding, reference is now made to the following description taken in conjunction with the accompanying Drawings in which:

FIG. 6 illustrates the interconnection between the vulnerability management system controller component and the Security Management System (SMS) of the threat protection system;

FIG. 7 is a flow diagram describing the operation of the system of the present disclosures;

FIG. 8 illustrates the mitigated risk report screen showing vulnerabilities that are fully covered/blocked by threat protection system filters;

FIG. 10 illustrates the active risk analysis screen which shows if a vulnerability is fully covered, partially covered or not covered by the threat protection system filters;

FIG. 11 illustrates the vulnerability report filter exception screen;

FIG. 12 illustrates the screen showing vulnerabilities for which there are no threat protection system filters available;

FIG. 14 illustrates the vulnerability status screen which demonstrate the state (block, permit, notify, block notify, permit notify) of threat protection system filter(s) for each vulnerability;

FIG. 15 illustrates the host report screen demonstrating the mapped threat protection system filters for each vulnerability;

FIG. 16 illustrates the active risk analysis screen showing if a vulnerability is fully covered, partially covered or not covered by the threat protection system filters with an additional button titled "view filters in collection" which will send the selected filter to the security management system and the threat protection system for activation.

DETAILED DESCRIPTION

Figure 1:
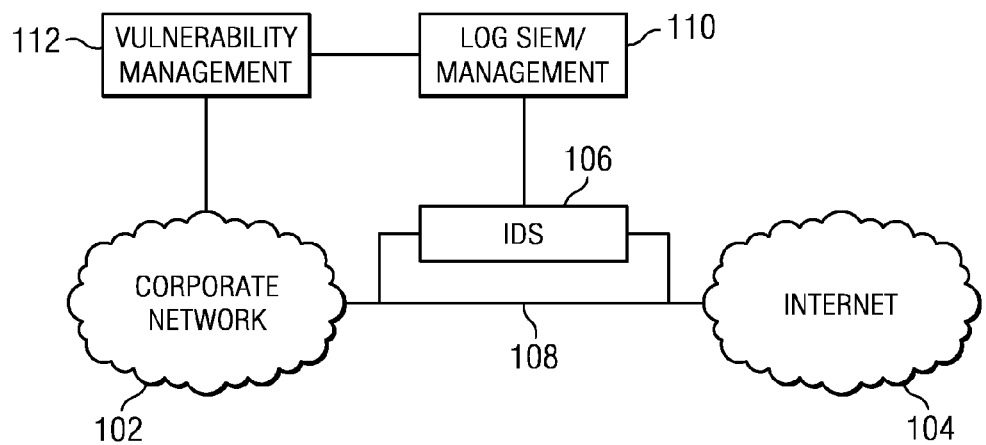
FIG. 1 illustrates the implementation of an intrusion detection system between a corporate network and the internet.

Referring now to the drawings, wherein like reference numbers are used herein to designate like elements throughout, the various views and embodiments of a system and method for selecting filters within an intrusion protection system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a corporate network 102 that is connected to the internet 104. While the illustration of FIG. 1 describes the connection of the corporate network 102 with the internet 104, the corporate network 102 could be connected with any global communications network similar to the internet or any other internal or locally available network from which communications from said network would require protection of the corporate network's 102 assets. Within the interconnection between the corporate network 102 and internet 104, an intrusion detection system (IDS) 106 is connected in parallel with the interconnection link 108 between the corporate network 102 and the internet 104 to detect potential intrusions or threats to the corporate network 102 that are attempted over the connection with the internet 104. The intrusion detection system 106 does not attempt to stop or remedy the intrusions that are detected over the link 108, but merely generate alarms illustrating the detected threats. A log management or SIEM (Security Information and Event Management) system 110 records the detected alarms provided by the intrusion detection system and compiles this information such that it may be presented and used by a corporate security analyst to determine how to remedy the network 102 based on the alarm information. The vulnerability management system 112 scans the corporate network 102 to find vulnerable systems. The vulnerability management system 112 passes the vulnerability information to the SIEM system 110 for correlation. The SIEM system 110 correlate IDS alarms with vulnerable system information to determine which alarms are real and require action and which alarms can be ignored. Based on this information, network 102 will be remediated to prevent a security breach.

Figure 2:
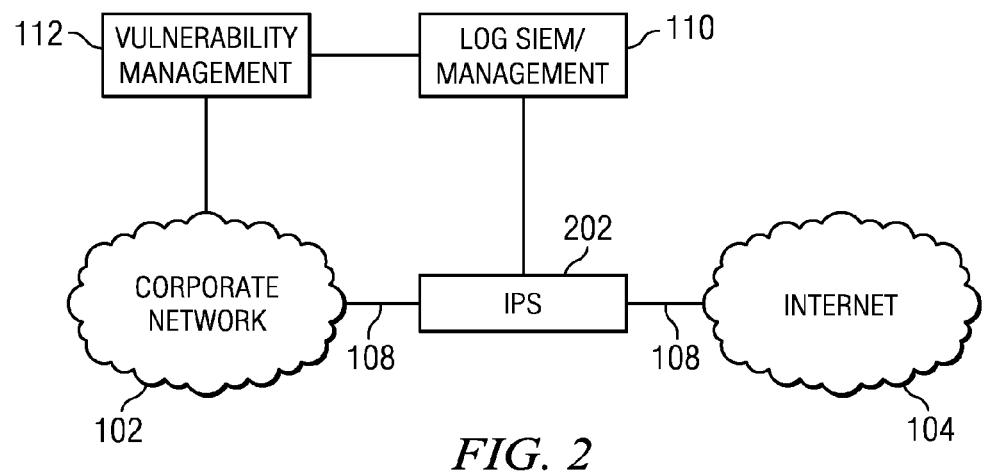
FIG. 2 illustrates an intrusion protection system implemented between a corporate network and the internet.

Referring now also to FIG. 2, there is illustrated an alternative protection system wherein the corporate network 102 is protected from intrusions occurring over the link 108 from the internet 104 on an intrusion protection system 202 rather than the intrusion detection system 106. The difference between the intrusion protection system 202 and the intrusion detection system 106 is that the intrusion protection system 202 is actually in line within the link 108 interconnecting the corporate network 102 with the internet 104. The intrusion protection system 202 is placed in such a manner that it may not only detect, but prevent or remedy certain intrusions by blocking malicious traffic that is detected over the link 108 interconnecting the corporate network 102 and the internet 104. The intrusion detection system 106 of FIG. 1 only detects the occurrences of the intrusions over the link 108 and generate alarms but does nothing to actively remedy within the intrusion detection system 106.

The intrusion protection system 202 includes a number of filters/signatures that are user configured by the operators of the corporate network 102 that protect the corporate network from particular intrusions. The filters/signatures comprise short pieces of code or programs that are implemented within the intrusion protection system 202 that prevent particular types of attacks or events from penetrating the corporate network 102 past the intrusion protection system 202. The code matches particular patterns in the incoming data stream that indicates an intrusion or undesired access and decides whether to allow or prevent the intrusion or access to the network. The intrusion protection system 202 does not necessarily need to protect the corporate network 102 from all intrusions that are detected over the link 108 from the internet 104 but are only required to protect the corporate network 102 from those intrusions to which the corporate network 102 is particularly vulnerable or susceptible. Thus, the filters within the internet protection system 202 are set by the security analyst or operators of the corporate network 102 normally in accordance with recommendations made by the providers of the intrusion protection system 202 and some knowledge of the network. This of course results in a very ad hoc protection of the corporate network 102 as the vendors of the intrusion protection system 202 are not necessarily aware of all of the vulnerabilities of the corporate network 102.

Figure 3:
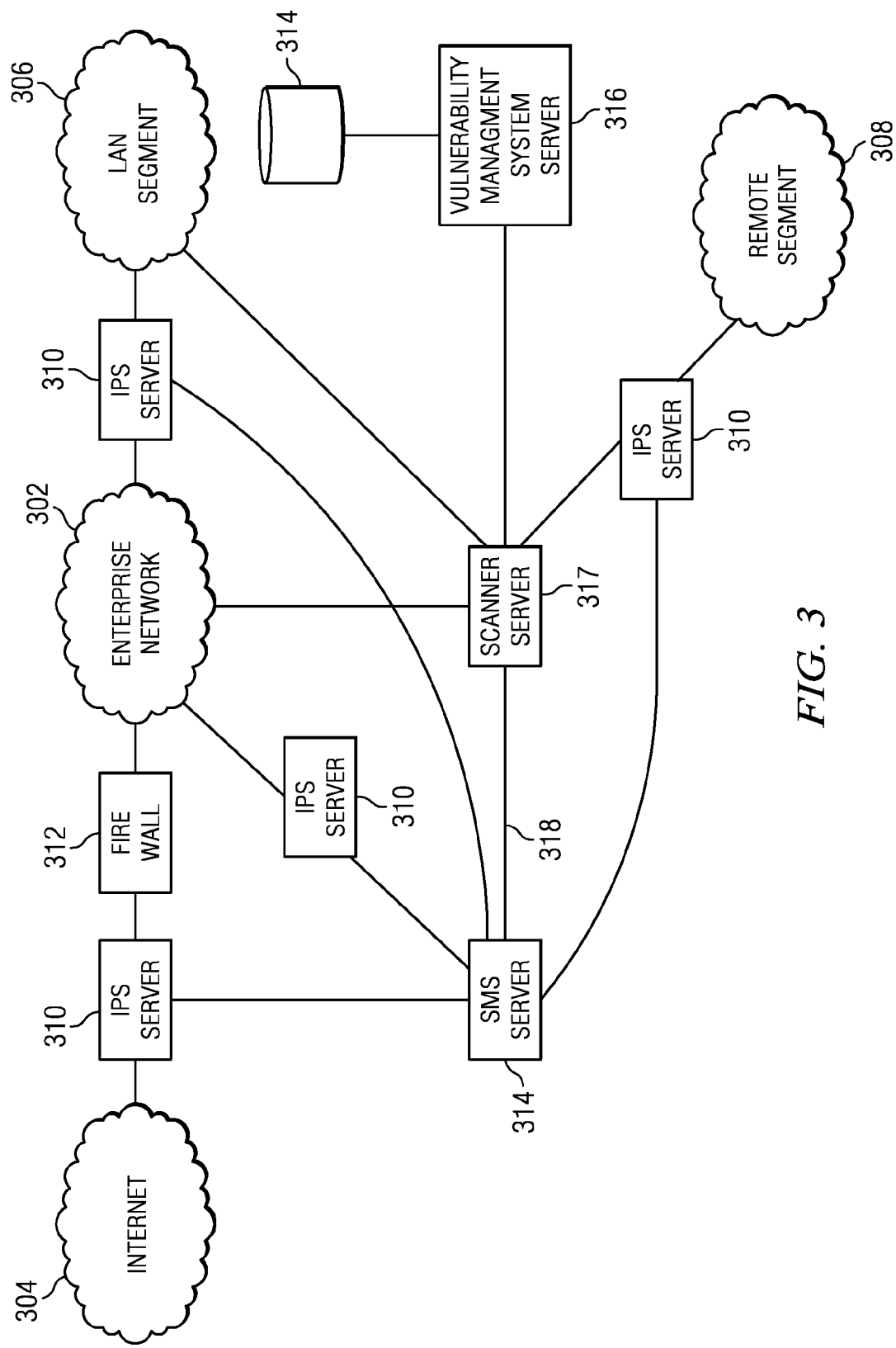
FIG. 3 illustrates the operating environment of the present system wherein a vulnerability management system is used to tune the filters of an intrusion protection system.

Referring now to FIG. 3, there is illustrated the network environment for utilizing the vulnerability management system operating according to the present disclosure. The environment of FIG. 3 includes an enterprise network 302 that is interconnected to a variety of different network types. It can be connected to the internet 304 or other type of global communications network, to a local area network segment 306 and to a remote network segment 308. Each of these external networks is connected to the enterprise network 302 through at least an intrusion protection server 310. As described previously, the intrusion protection servers 310 include a number of configurable filters/signatures associated with each of the IPS servers 310 that disable particular types of intrusion attacks between an external network or server and the enterprise network 302 to be protected from by selecting or not selecting operation of the filter. Selection of the various filters within the intrusion protection server 310 while protecting the enterprise network 302 from the particular type of attack associated with the filter requires the use of bandwidth within the enterprise network 302. Thus, it is not practical to implement the filters within the intrusion protection servers 310 by selecting all of the filters to be activated. This would place unrealistic bandwidth demands upon the enterprise network 302 and slow its operation to unacceptable levels. Thus, most filters within intrusion protection servers 310 are configured by selecting the particular filters based upon recommendations of the vendor or manufacturer of the enterprise network and some knowledge of the network. This type of protection is normally on an ad hoc basis wherein after the network has shown itself vulnerable to particular types of attacks, a determination is made that an additional filter is needed to protect against this and can then be implemented and selected within the intrusion protection server 310.

While this one-size fits all approach can protect the enterprise network 302 from previously determined vulnerabilities of the network 302, the solution does not provide adequate protection in the dynamic threat environment in which most enterprise networks 302 operate today. Particular types of vulnerability attacks are continuously evolving and the need to keep up with these attacks is paramount to maintaining network operating security. Furthermore, each enterprise network 302 is uniquely configured to meet the requirements of the particular organizational entity with which the enterprise network 302 is involved. No two networks 302 are exactly alike and thus while a one-size fits all type filter setting approach within the IPS servers 310 can provide some protection. This solution may also miss various types of filters that are necessary and available for a particular type of vulnerability of the enterprise network 302 and may additionally require the implementation of filters within the IPS servers 310 that are not applicable to the corresponding enterprise network 302.

In addition to the protection provided by the IPS server 310 between the internet 304 and enterprise network 302, a firewall 312 is located between the IPS server 310 and the enterprise network 302. The firewall is designed to block unauthorized access while permitting authorized communications. It is a device or set of devices configured to permit, deny, encrypt, decrypt or proxy all computer traffic between security domains based upon a defined set of rules or other criteria. Firewalls can even be implemented in hardware or software or a combination thereof.

Each of the IPS servers 310 may have the filters implemented therein controlled via the security management system (SMS) 314. The security management system 314 acts as the command and control unit for each of the IPS servers 310 associated with the enterprise network 302. The SMS server 314 sets the individual filters within each of the IPS servers 310 responsive to control commands input thereto.

In order to improve the operation of the intrusion protections servers 310, the operation of the vulnerability management system server 316 is connected with the SMS server 314 via a VM (vulnerability management) scanner server 317 over a communications link 318. The VM scanner server 317 scans the enterprise network 302 to determine the vulnerabilities present on the network. The vulnerability management system server 316 has a map of every known vulnerability of the network 302 and the filter(s) that can protect for that vulnerability at the IPS 310 stored within an associated database 319. The vulnerability management system 316 combines the mapped information from the database 319 with real time filter/signature information from the IPS servers 310 to recommend to the SMS 314 which filters/signatures can be applied to protect for the vulnerabilities of enterprise network 302. The operation of the vulnerability management system 316 and the VM scanner server 317 determines and reports system vulnerabilities in the manner described with respect to U.S. Pat. No. 7,325,252, issued on Jan. 29, 2008, entitled NETWORK SECURITY TESTING and U.S. patent application Ser. No. 11/225,411, filed Sep. 13, 2005, entitled METHOD AND SYSTEM FOR APPLYING SECURITY VULNERABILITY MANAGEMENT PROCESS TO AN ORGANIZATION, each of which are incorporated herein by reference.

The vulnerability management system VM Server Component 317 scans the enterprise network 302 and any associated network such as the LAN segment 306 to determine what devices or nodes within these networks are vulnerable to attack and makes recommendations on how best to fix the devices within the network. This fix may be via a patch, a configuration change or various types of workarounds. Additionally, the vulnerability management system 316 applies the vulnerability to filter mapping stored in its database to the vulnerabilities discovered by the vulnerability scan process to determine the various IPS filters within the IPS servers 310 that will provide protection from the discovered vulnerabilities if applied. Additionally, the vulnerability management system VM Server component 317 interfaces to the IPS server's management console, i.e., the SMS server 314 to determine which of the IPS filters are presently active within each of the IPS servers 310. The vulnerability management system server 316 may determine whether the IPS filters are active in a block or detect mode of operation, i.e., is blocking detected intrusions or merely detecting particular intrusion types or whether the IPS filter is inactive.

If the vulnerability management system server 316 detects vulnerabilities within the enterprise network 302 for which there are no IPS filters available, the system provides an indication that a patch is necessary for the vulnerable device. This integrated view provided by the vulnerability management system 316 enables a user to mitigate the risk at the network level by tuning the IPS filters or at the host level by applying patches to a vulnerable device. If a particular vulnerability is mitigated through an IPS filter, an exceptions management report component of the vulnerability management system may provide an indication that particular vulnerabilities have been addressed via use of implemented IPS filters, i.e. a countermeasure is in place.

While the embodiment described with respect to FIG. 3 describes the vulnerability management system 316 and database of mapped vulnerabilities being implemented separately from the security management system and intrusion protection system, in other embodiments these components could be wholly or partially implemented within the same system components. For example, the vulnerability management system and database could be implement with the intrusion protection system within a network firewall or the vulnerability management system, security management system, security management system and intrusion protection system could each be implemented within the same server or hardware. Additionally, the firewall, intrusion protection system and security management system could be implemented in a single component and the vulnerability management system and database could interact with this single component.

Figure 4:
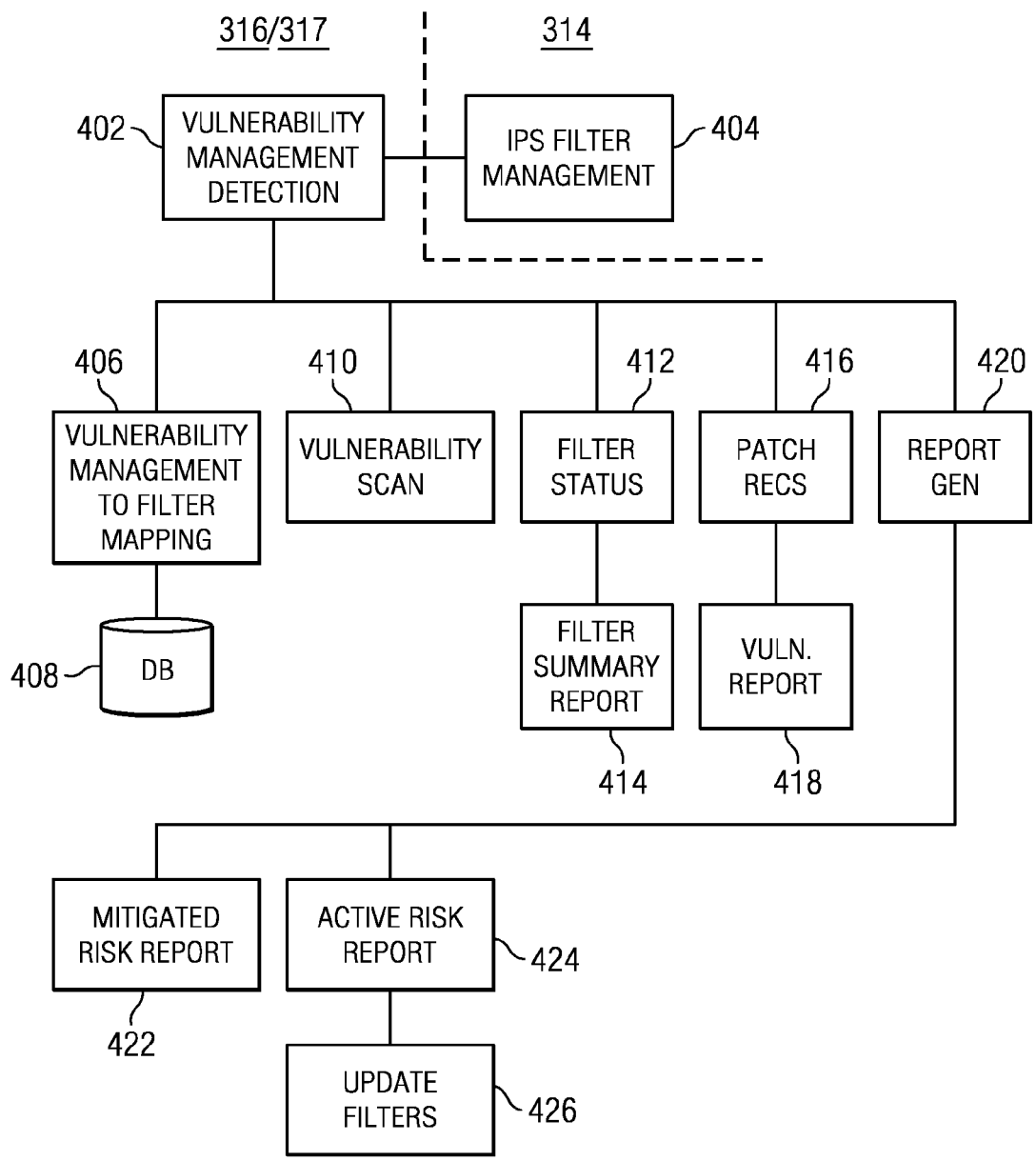
FIG. 4 illustrates the operational components of enabling use of the vulnerability management detection system to control selection of the filters of the intrusion protection system.

Referring now to FIG. 4, there are more particularly illustrated the functional blocks within the vulnerability management system 316 and its VM scanner server component 317 and the SMS server 314. The vulnerability management detection functionality 402 is responsible for generating a list of vulnerabilities within the particular network that is being scanned by the VM scanning server component 317. The vulnerability management system VM scanning server component 317 is in communication with the SMS server 314 and its associated IPS filter management functionalities 404 to determine which filters are applied or not applied at each IPS. The IPS filter management functionalities 404 provide information relating to the available filters within associated IPS servers 310 (FIG. 3) that may be controlled by the SMS server 314. The vulnerability management detection functionalities 402 provide the vulnerability information found in a network. Database 408 has the entire mapping of all known vulnerabilities of any network to all known filters options provided by the IPS servers 310. The vulnerability management to filter mapping functionality 406 can utilize the SMS information about what filters are installed at each IPS server 310 to compare against the found vulnerabilities of the network and the mapped information contained within the database 408 to determine which vulnerabilities are fully protected, which vulnerabilities are partially protected and which vulnerabilities are not protected. By comparing the unprotected and partially protected vulnerabilities to the full map of vulnerabilities to filters in database 408 and the available filters from the IPS, the vulnerability management to filter mapping functionality 406 can find what other filters are available to provide full coverage for the rest of the vulnerabilities and which vulnerabilities need to be patched since they have no filters coverage. This information is also stored within database 408.

Figure 5:
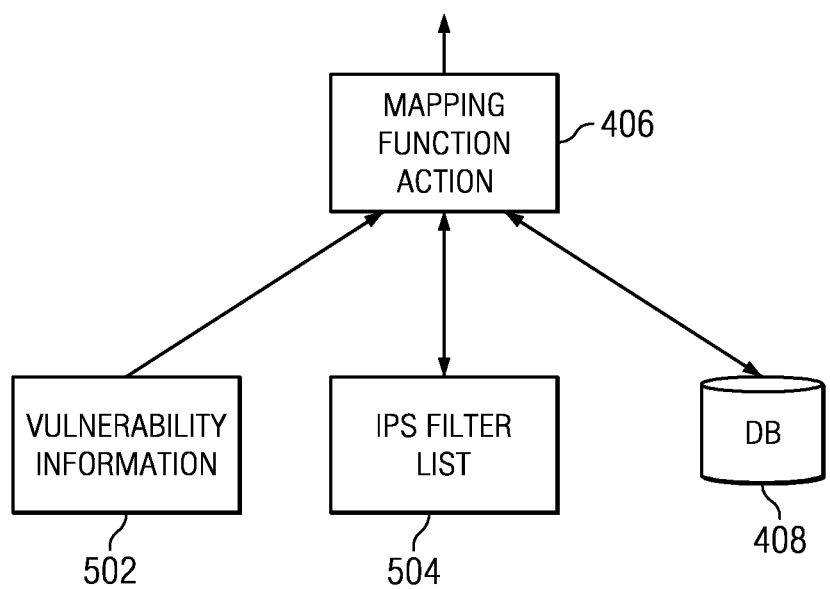
FIG. 5 illustrates the manner in which vulnerability information may be mapped to particular intrusion protection system filters.

This process is more fully illustrated in FIG. 5. In this case, the vulnerability information 502 that is generated by the vulnerability management detection functionality 402 provides its vulnerability information to the mapping function 406 associated with the vulnerability management system 316. Additionally, the list of IPS filters 504 currently installed at the IPS 310 and generated by the IPS filter management functionality 404 within the SMS management server 314 are also provided to the mapping function 406 within the vulnerability management detection functionality 402. Finally, the mapped vulnerability to filter data from the database 408 is provided to the mapping function 406. The mapping function 406 is able to map/associate particular vulnerabilities within the system with specific filters that will protect against the vulnerability that has been detected by the vulnerability management detection functionality 402. By comparing currently installed filters with current vulnerabilities the mapping function 406 can tell how much coverage is provided with the installed filters and by comparing the rest of the uncovered vulnerabilities to database mapping function 406 can tell what other filters can be applied to protect the rest of the vulnerabilities and which vulnerabilities have no filters. In the general example illustrated in FIG. 5, a vulnerability number 1 detected by the vulnerability management detection function 402 may be protected from using three different filters. Each of the filters has a particular status associated therewith. These statuses may comprise: block, block+notify, block+notify+trace, permit+notify, permit+notify+_trace, recommended and trust. Similarly, vulnerability number 2 detected by the vulnerability management system 316 may be protected by four different filters, each having an associated status. Lastly, vulnerability number 3 may be protected from utilizing two different filters having an associate status. The database 408 will include each of the vulnerabilities detected by the system and will have mapped thereto various filters that may protect against the vulnerability if any. Mapping function 406 analysis provides the recommend action for the selection of the missing filters based on the network current vulnerabilities to provide the needed network protection. The network operator then decides in what status to position each filter for continued operation. These statuses may comprise: block, block+notify, block+notify+trace, permit+notify, permit+notify+_trace, recommended and trust or others.

Referring now back to FIG. 4, in addition to providing the vulnerability management to filter mapping functionality 406, the vulnerability management detection functionality 402 provides the vulnerability scan functionality 410 which enables vulnerability management detection system 316 to detect various vulnerabilities within the network with which the vulnerability management system VM scanner server 317 is associated. After the vulnerability-to-filter mapping is applied to the various network vulnerabilities and it is apparent which filters which may be used to protect against these vulnerabilities, other functionalities may be used to display or control information with respect to the various filters controlled by the IPS filter management functionality 404. The filter status functionality 412 is responsible for determining the state of each of the filters associated with a particular vulnerability within the database 408 such that a user may be made aware of whether a filter that will protect against a particular functionality is enabled or disabled. The filter summary report functionality 414 utilizes the information within the filter status functionality 412 to generate a report that illustrates, with respect to vulnerabilities within the systems and their associated filters which may protect against the vulnerabilities, whether the filter is presently active or inactive with regard to the system vulnerability of concern. The particular report generated by the filter summary report functionality 414 will be more fully illustrated hereinbelow.

The patch recommendation functionality 416 is responsible for generating a recommendation for patches associated with particular vulnerabilities that have been detected by the vulnerability scan functionality 410; yet, do not have an associated filter in database 408 which can protect the vulnerability from a network intrusion. Vulnerability report functionality 418 is used for generating a list of the vulnerabilities that require patches to be applied therefor. The vulnerability report generated by the vulnerability report functionality 418 will be more fully described hereinbelow.

The report generation functionality 420 generates reports that demonstrate the results of the mapping performed by the vulnerability management to filter mapping functionality 406 and the filter status functionality 412 to illustrate the protections provided by the filters that are associated with particular vulnerabilities. The mitigated risk report functionality 422 generates a list of vulnerabilities that are presently protected by an enabled filter within a particular intrusion protection system. This report enables a user to see which vulnerabilities are no longer of major concern to the enterprise network.

Additionally, the active risk report functionality 424 generates a report of particular vulnerabilities that are of present concern to system administrators of the enterprise network. The active risk report functionality 424 generates reports, that will be described more fully hereinbelow, illustrating vulnerabilities that are either partially or fully susceptible to intrusion attacks because particular filters, which are available to protect the network from the vulnerabilities, have not been fully implemented. If the user decides to protect from the indicated vulnerabilities, the update filters functionality 426 may be used to select the particular filters that have not yet been activated and activate them such that the enterprise network is more fully protected from the system vulnerabilities that have been detected and are associated with the indicated filters. The updated filters are provided to the IPS filter management functionality 404 within the security management service (SMS) server 314 to enable their activation within the intrusion protection systems of the network. Thus, using the information generated from the active risk report functionality 424, the update filters functionality 426 may configure filters within the intrusion protection system based upon the actual vulnerabilities detected by the vulnerability management system 316 rather than just vendor recommendations. This type of configuration will limit the risk of blocking legitimate traffic within or to the enterprise network but provides a warranted reason to justify inadvertent blocking of legitimate traffic. Additionally, the active risk report functionality 422 may be used to internally create exceptions for particular vulnerabilities from subsequent reports by the vulnerability management detection system 316. The reason being that since particular filters (signatures) have been implemented within the intrusion protection system 310 to protected against a selected vulnerability, there is no more need to generate reports with respect to the vulnerability and the associated filter since the protections against the vulnerability are active. This will prevent the system from providing a user with information that is not important to their analysis of the vulnerabilities of present concern to system administrators of the enterprise network. By utilizing the information generated by the active risk report functionality 424, additional unneeded filters may be eliminated which maximizes the system bandwidth of the enterprise network 302.

Referring now to FIG. 6, there is more fully illustrated the interacting components to enable the update filters functionalities 426 to enable and disable various filters located within IPS servers 310. The vulnerability management system 316 gathers the information on system vulnerabilities via associated scanning server 317. Using this information and filter information obtained from the security management system (SMS) 314, the mapping functionalities 604 implemented within the vulnerability management system 316 described hereinabove with respect to FIG. 4 enable mapping of particular system vulnerabilities detected by the scanning server 317 with various filters that may be implemented within the IPS servers 310. The vulnerability management system 316 which is in a central facility communicates with the SMS 314 via scanning servers 317 which resides on the scanned network using link 606. The vulnerability management system 316 generates instructions telling the SMS 314 which filters to turn on or to turn off. The SMS 314 generates instructions to the IPS servers 310 to enable or disable the associated filter via communications link 608.

This integration between the vulnerability management system 316 and the SMS 314 enables enterprise network operators to better tune their filters within the IPS servers 310 based upon the vulnerability scan results determined by the scanning server 317. The vulnerability management system 316 is daily updated with new vulnerabilities found and new IPS filters are regularly written to protect from these new vulnerabilities. The new IPS filters to new vulnerabilities mapping is updated using functionality 604 so that vulnerability descriptions provide current remediation instructions as well as the corresponding IPS filters to provide the remediation. The interconnection between the scanning server 317 and the SMS 314 enables the vulnerability management system 316 to determine which IPS filters are applied at which IPS servers 310. This information enables the generation of the report relating to presently mitigated vulnerabilities, vulnerabilities that could be mitigated if the appropriate filter were activated, IPS filters that could have the greatest impact on potential risk, and vulnerabilities which have no IPS filter coverage and must be mitigated via patch or configuration level solutions. These results provide the system operator with visibility of the optimal mitigation point either by applying filters to the IPS or by patching the vulnerabilities at the device level. Additional features enable audit defense and the ability to log compensating controls by documenting risks that are mitigated by the established IPS filters.

The vulnerability management system 316 includes system management hardware and scanning server 317. In order for the vulnerability management server 316 to interconnect with the security management system (SMS) 314, connection configuration functionality 610 is used to register the preconfigured SMS 314 with the appropriate vulnerability management system 316. This enables the filter information to be polled, read, analyzed and reported by the vulnerability management system 316 by polling the filters information from the SMS 314.

If the system management server 314 has not yet been configured or successfully polled, the vulnerability to filter recommendation functionality 604 will not be available, and a system operator would be notified that a connection with a system management server 314 was not presently available. Once the system management server 314 has been configured and registered with respect to the vulnerability management server 316, the recommendation functionality 604 may then occur. Due to the general mapping of all vulnerabilities to all filters in database 408, each vulnerability has the entire filter set it needs. But without the communication with the SMS 314 there is no way to know what is installed on the IPS 310 and what is missing. When configuring a particular vulnerability management system 316 to communicate with a SMS 314, the mapping functionality 604 initially requires selection of a particular scanning server 317. Next, information with respect to the SMS 314 that is being accessed by the selected scanning server 317 must be selected. This information includes the IP address of the SMS 314 to be polled. Additionally, the port of the SMS server 314 must be provided. A user name and password for the SMS service manager account user is entered and the number of hours between polls of the SMS 314 by the scanning server 317 must be selected. The minimum value is one hour. This information is saved, and the scanning server 317 may attempt its first polling of the SMS 314 over the established link 606.

Once the connection is established between the scanning server 317 and SMS 314, the various reports and displays which will be more fully described herein with respect to FIGS. 8-16 may be viewed with respect to the vulnerability management server to determine and control the various filters that may now be controlled.

Referring now to FIG. 7, there is illustrated a flow diagram describing the operation of the system described hereinabove. Initially, the scanning server 317 scans and determines at step 702 various network vulnerabilities associated with the enterprise network 302. Any found vulnerability can display at step 704 all the IPS filters/signatures associated with that vulnerability using database 408. Once the various vulnerabilities are determined by the scanning server 317, the vulnerability management system 316 may poll the security management system (SMS) 314 to determine the various filters currently activated in the intrusion protection system servers 310 at step 706. Utilizing the received IPS filter status as well as determining system vulnerabilities, the vulnerabilities may be mapped to the current filters status to determine current vulnerability protection by the filters at step 708. Using the maps of vulnerabilities to filters in the database 408, various reports may be generated at step 710 with respect to the mapping result as will be described more fully herein below. Utilizing the report results, the filters that are presently set within the IPS servers 310 may be updated at step 712 to either add additional filters to protect against as yet unprotected system vulnerabilities or to remove unnecessary filters. Additionally, information to limit the reporting on filters and vulnerabilities that are no longer an issue may be created at step 714. Responsive to the information with respect to the updates to the filter sets, instructions are generated for transmission to the system management server 314 from the vulnerability management server 316 to reflect the filter updates at step 716 that have been created at step 712. The system management server 314 sends information at step 718 to update the various IPS server 310 filters that have been indicated as being updated.

Referring now to FIG. 8, there is illustrated a screen shot of a mitigated risk report display associated with the vulnerability management functionalities generated by the vulnerability management server 316. The mitigated risk report display shows vulnerabilities that are fully covered (blocked) by IPS filters. By clicking on the filter reports tab 802, the system operator is provided access to the various information functionalities and reports available from the vulnerability and filters mapping functionalities. The configurations tab 804 enables configuration of the associated scanning server 317 with a system management server 314 to enable polling of it to obtain filter information as described previously. The mitigated risk tab 806 provides display of the mitigated risk information as illustrated in FIG. 8. The mitigated risk information displays various vulnerabilities that are presently protected from via the enabled filter sets within the IPS servers 310. Field 808 may be selected such that the vulnerability and mitigated risk for the presently selected node and any nodes below the selected nodes are displayed. The node is selected within the navigation area 810 which may be used to navigate amongst the various nodes within the enterprise network as described in corresponding U.S. patent application Ser. No. 11/225,441, filed Sep. 13, 2005, entitled METHOD AND SYSTEM FOR APPLYING SECURITY VULNERABILITY MANAGEMENT PROCESS TO AN ORGANIZATION, which has been incorporated herein by reference. Field 812 may be selected such that the mitigated results only for the selected node are illustrated. The filters column 824 indicates the number of vulnerabilities that have been mitigated (malicious traffic was blocked at the IPS level) by an associated filter.

Figure 9:
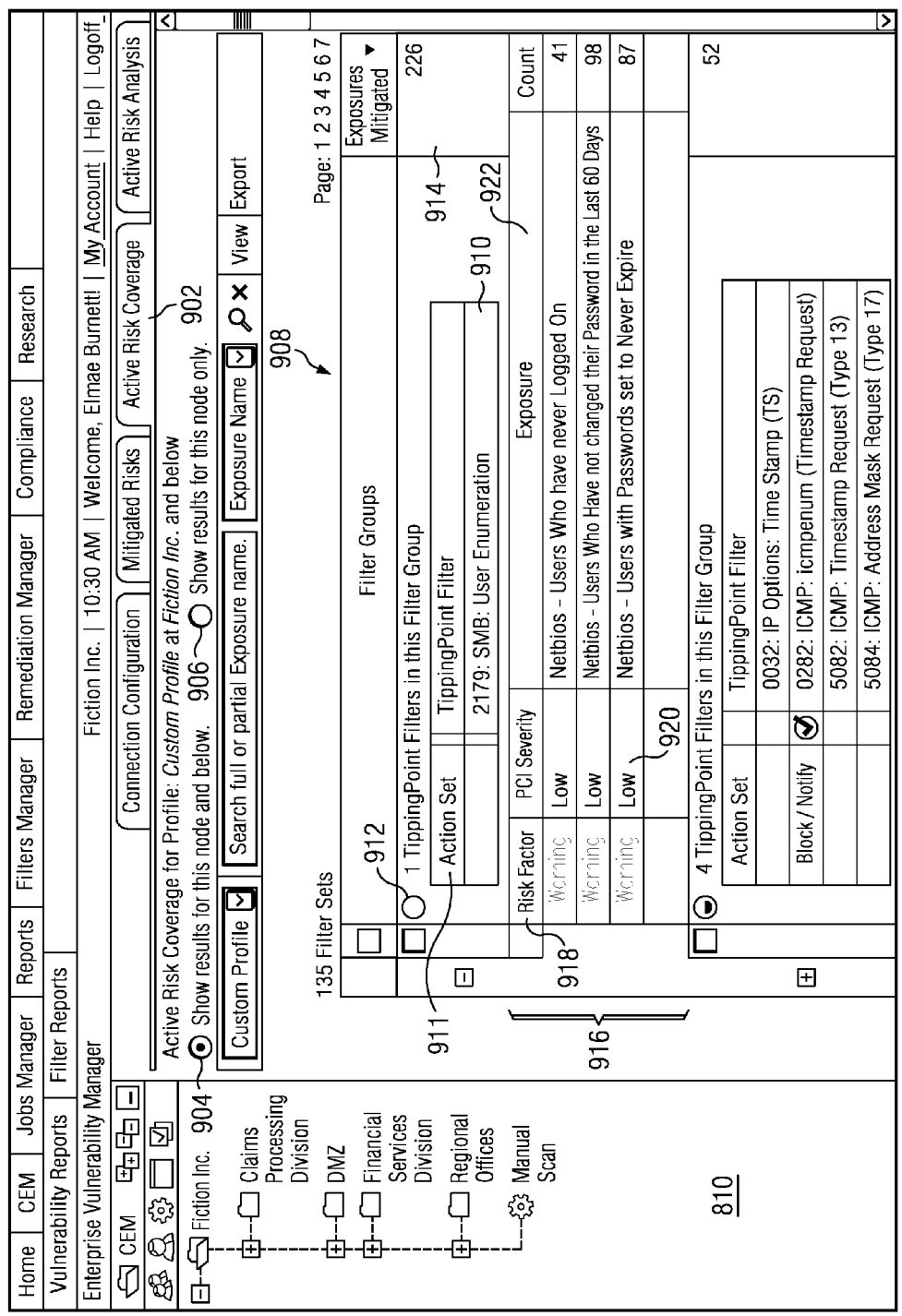
FIG. 9 illustrates the active risk report screen demonstrating the number of vulnerabilities that an threat protection system filters can affect if applied.

Referring now to FIG. 9, upon clicking the active risk coverage tab 902, the display shows the current status i.e. block, permit notify, block notify of all IPS filters. This illustrates the active risk report screen which demonstrates the number of vulnerabilities that an IPS filter can affect if applied. As described before, field 904 can be selected such that only the results for the present node and all nodes below are displayed while field 906 can be selected to show the results only for the presently selected node. The nodes are selected within the navigation area 810. The filter groups 908 are grouped according to a series of filters that are able to protect from particular group of vulnerabilities. The filter fields 910 list all of the particular filters within a group and the indicator bubble 912 indicates whether the risks are completely unprotected from or only partially protected from based on which filters in the group are applied and which are not. The exposures mitigated column 914 describes the number of vulnerabilities from which the group of filters can protect the enterprise network. Fields 916 illustrate the risk factor column 918, PCI severity column 920 and exposure column 922. The risk factor column 918 indicates the potential risk level associated with the detected vulnerability at a "high level," "low level" or "warning level." The PCI severity column 920 indicates the PCI severity based upon an "urgent," "high" or "low" level. The exposure column 922 indicates the particular vulnerability that may be associated with the filter group for protection. The action set field 911 indicates the status of the filter(s) that is designated within the filter field 910 which may be a block, block+notify, block+notify+trace, permit+notify, permit+notify+_trace, recommended and trust.

Referring now to FIG. 10, there is illustrated the screen displayed at the display associated with the vulnerability management system server 316 when the active risk analysis tab 1002 is actuated. The active risk analysis screen shows if a vulnerability is fully covered, partially covered or not covered by the IPS filters. As described previously, based upon the particular node selected within the navigation area 810. Either the field 1004 or field 1006 may be selected to determine whether the results for a selected node and all nodes below the selected node are displayed if field 1004 is selected or the results for only the selected node are displayed if field 1006 is selected. The active risk analysis screen can display all of the active risks that have associated IPS filters associated therewith by clicking tab 1008 or may display all of the active risks that do not have a filter associated therewith by clicking tab 1010.

The illustration of FIG. 10 shows the view when tab 1008 has been selected and illustrates all of the active risks for which filters are available. The filtering column 1022 includes a number of boxes which may be checked in order create an exception for the selected vulnerability from subsequent vulnerability management reports that are generated. By checking a box within this column 1022 and clicking field 1026, a pull down menu including the field 1027 "apply scan filters for all items" is displayed. The filters can be applied by clicking on field 1027 such that the filters are activated to apply the vulnerabilities exceptions. Filters can be applied to selected items by selecting the vulnerabilities and clicking field 1029 "apply scan filters to selected items." The user is spared from viewing vulnerabilities which they have previously noted have been protected from by the applied IPS filters (signature) within the system. Column 1012 provides an indication of the IPS filters (applied signatures) protection presently provided to a particular vulnerability. A full bubble indicates that the vulnerability is fully protected by all available filters, while a half bubble indicates that the vulnerability is partially protected by part of the available filters. An open bubble indicates that the vulnerability is not protected from by the available IPS filter(s). The risk factor column 1014 indicates the level of risk associated with the identified vulnerability be it "high," "medium", "low," or "warning". The PCI severity column 1016 indicates possibly five levels of severity associated with the particular vulnerability. These may be indicated as "urgent," "high" or "low." The exposure column 1018 lists the name for the particular vulnerabilities that have been detected by the system. These vulnerability names are standardized in accordance with CVE and other industry standards. Finally, the total column 1020 indicates the number of occurrences of the vulnerability listed within the exposure column 1018 that has been detected.

Figure 11:
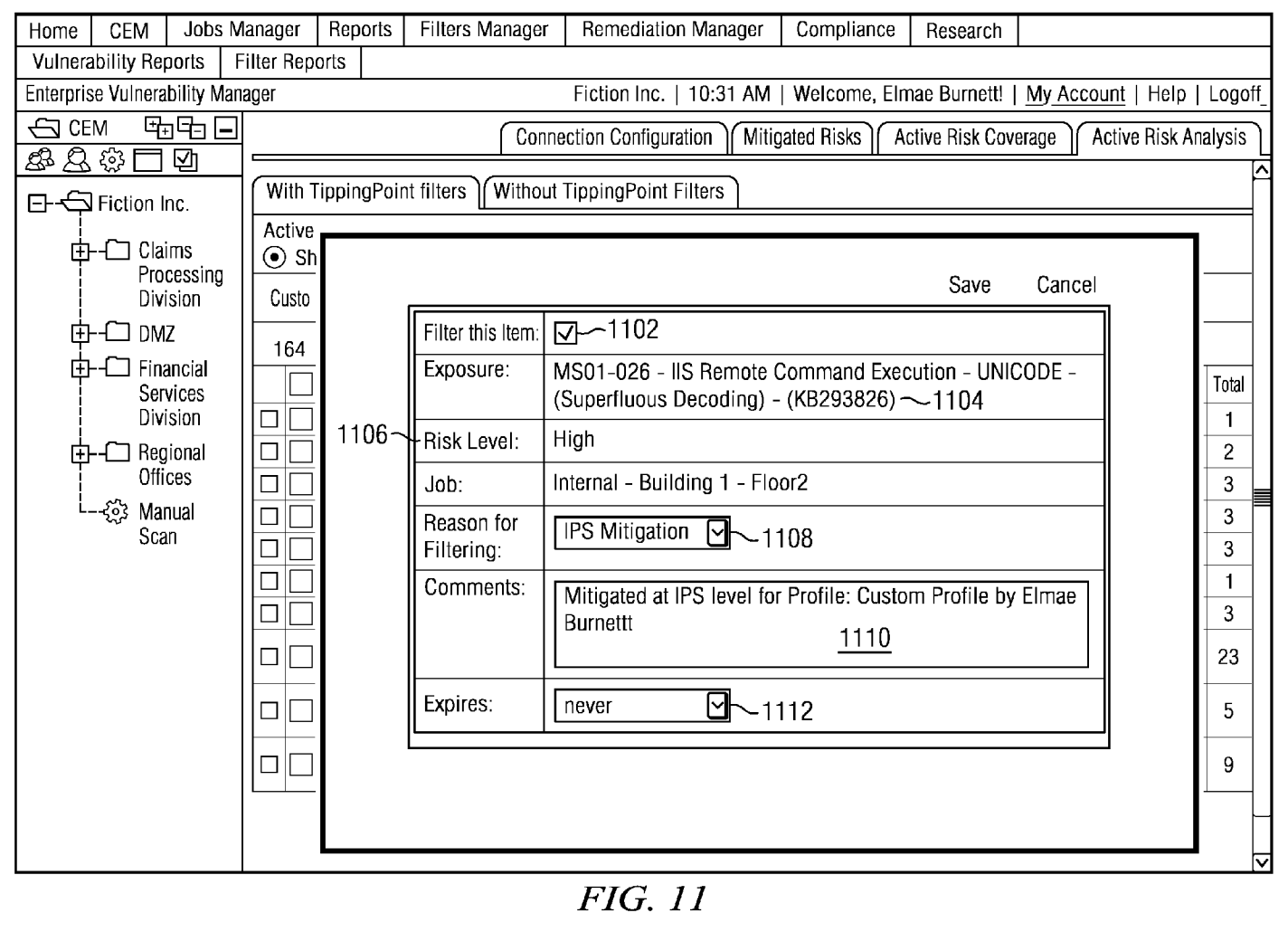

Referring now to FIG. 11, there is illustrated the screen that is displayed when an exception is being created for a particular risk vulnerability remove it from subsequent active risk analysis report and standard vulnerability management reports. The screen is brought up by selecting vulnerabilities on 1022 to be filtered and then clicking field 1026. The system user has the ability to set a scan filter within the active risk analysis profile of FIG. 10 in order to suppress a reported vulnerability that has been mitigated by initiating particular IPS filters to protect from the indicated vulnerability. This is achieved by checking the selected box within column 1022 and then clicking 1026. Field 1102 may be checked to indicate that the risk is no longer to be generated within the active risk analysis report and standard vulnerability reporting. The exposure field 1104 provides the standardized name of the detected vulnerability while the risk level field 1106 indicates the risk associated with the vulnerability. Drop down menu 1108 can be used to indicate the reason for filtering out the vulnerability from the report, and a comments field 1110 can be used for entering information for as to why the vulnerability is being filtered. Finally, a drop down menu 1112 may be used to indicate the point of which the filtering of the vulnerability may expire and the vulnerability would again be displayed by the system.

Referring now to FIG. 12, there is illustrated the report displayed when the without tipping point filters tab 1010 has been selected. This screen illustrates the various vulnerabilities that have been detected for which no filters exist. These vulnerabilities would have to be corrected via some type of system patch. Column 1202 comprises the risk factor column indicating the particular risk of either a "high," "medium" or "low" level that is associated with the detected vulnerability. The PCI severity column 1204 indicates the PCI severity associated with the detected vulnerability at a "critical," "urgent," "high" or "low" level. The exposure column 1206 provides the standardized name for the detected vulnerabilities. Finally, the total column 1208 indicates the total detections of these vulnerabilities within the enterprise network.

Figure 13:
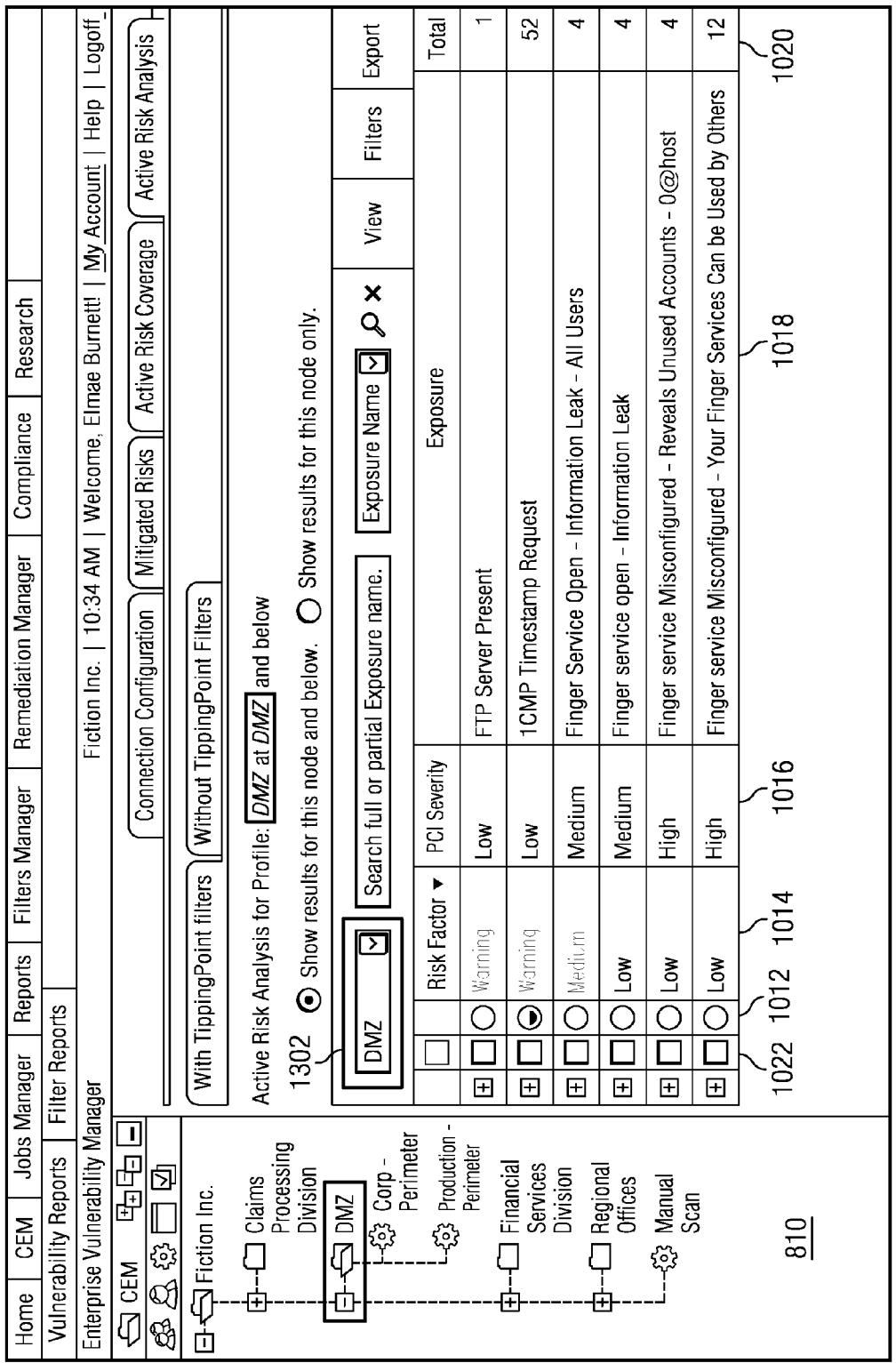
FIG. 13 illustrates the sub node active risk analysis screen which show if a vulnerability is fully covered, partially covered or not covered by threat protection system filters for a specific (DMZ) profile.

Referring now to FIG. 13, there is illustrated an active risk analysis report for a sub node of DMZ under the Fiction Inc. node described within the navigation area 810. This report is the same as that illustrated with respect to FIG. 10, but merely focuses upon a smaller area of the overall enterprise network at node DMZ showing node DMZ and everything below there. The DMZ comprises a subset of nodes or components of the network such that results only with respect to the subset of nodes or components may be viewed. All of the additional portions under the Fiction Inc. node are eliminated in this sub report. This would allow a system administrator to select the particular node or nodes with which they were interested in auditing or managing the system vulnerabilities and determining the filters to be thought associated with their system vulnerabilities and work only on that portion of the network which was of greatest concern to them. The fields described previously with respect to FIG. 10 are the same in FIG. 13 as the same information upon a smaller granular level is being illustrated. The particular profile i.e. collection of IPS filters configurations that is selected in this case, the DMZ profile, is done through the profile selection field 1302. This comprises a drop down menu illustrating the profiles currently activated within the IPS for which active risk analysis may be performed.

Figure 14:
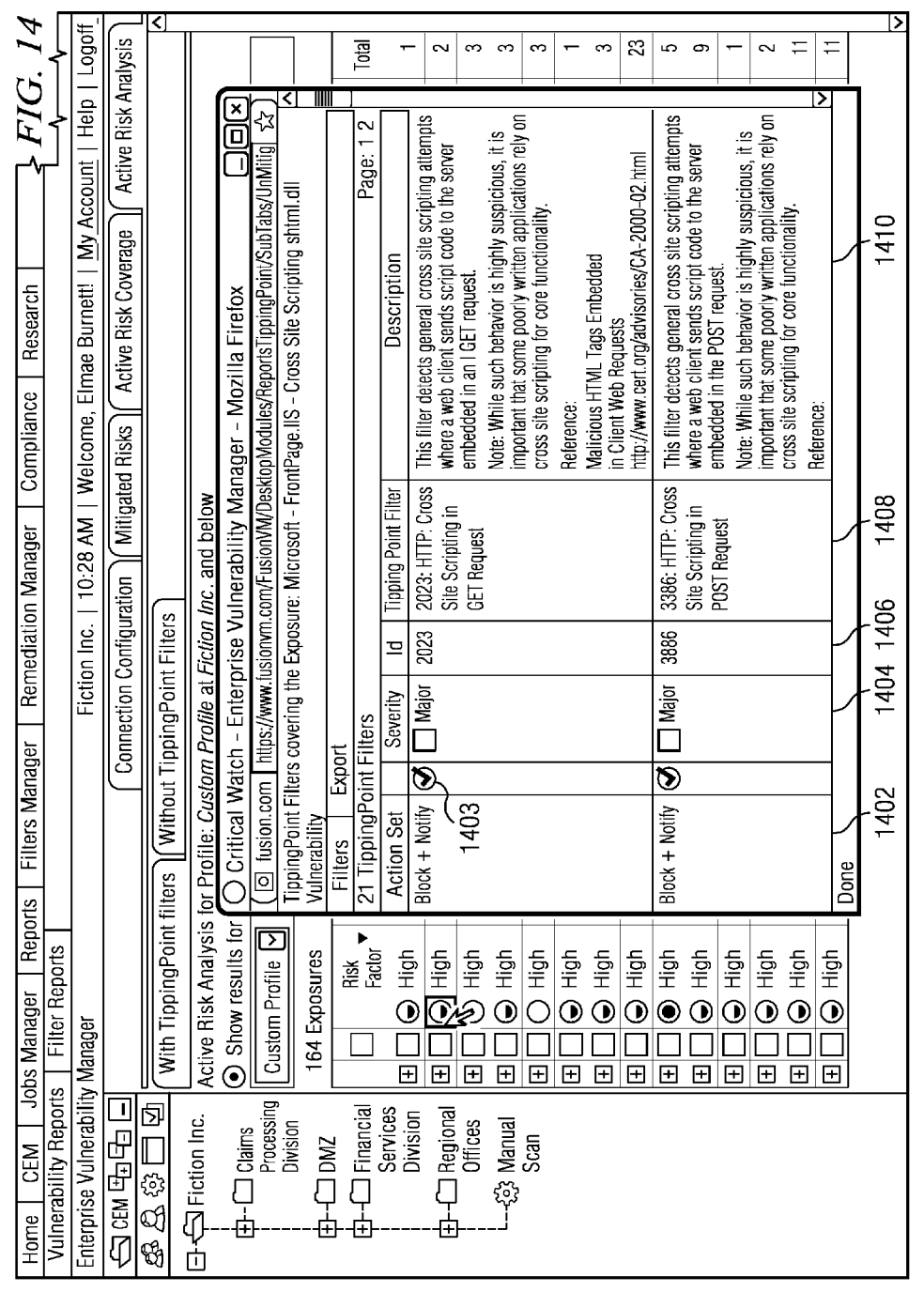

Referring now to FIG. 14, there is illustrated the screen display when the filter bubble in column 1012 is selected within the active risk analysis report for vulnerabilities having IPS filters. When a particular bubble within column 1012 of FIG. 10 is double clicked, the screen of FIG. 14 is displayed. This screen includes a list of the IPS filters that are available for protecting from the vulnerability that is in the selected row. The action set column 1402 describes the status of the filter that is described. The descriptions can rank from block, block+notify, block+notify+trace, permit+notify, permit+notify+_trace, recommended and trust. The bubble indicator 1403 is either checked or unchecked. If checked, this indicator 1403 indicates that the status of the filter includes a block action as part of its status. If the indicator 1403 is unchecked, the filter status does not include a block action as part of its status. The severity field 1404 indicates the severity of the vulnerability that the filter protects the network.

Finally, the description field 1410 enables a short description of the filter and what it accomplishes within the IPS server.

Figure 15:
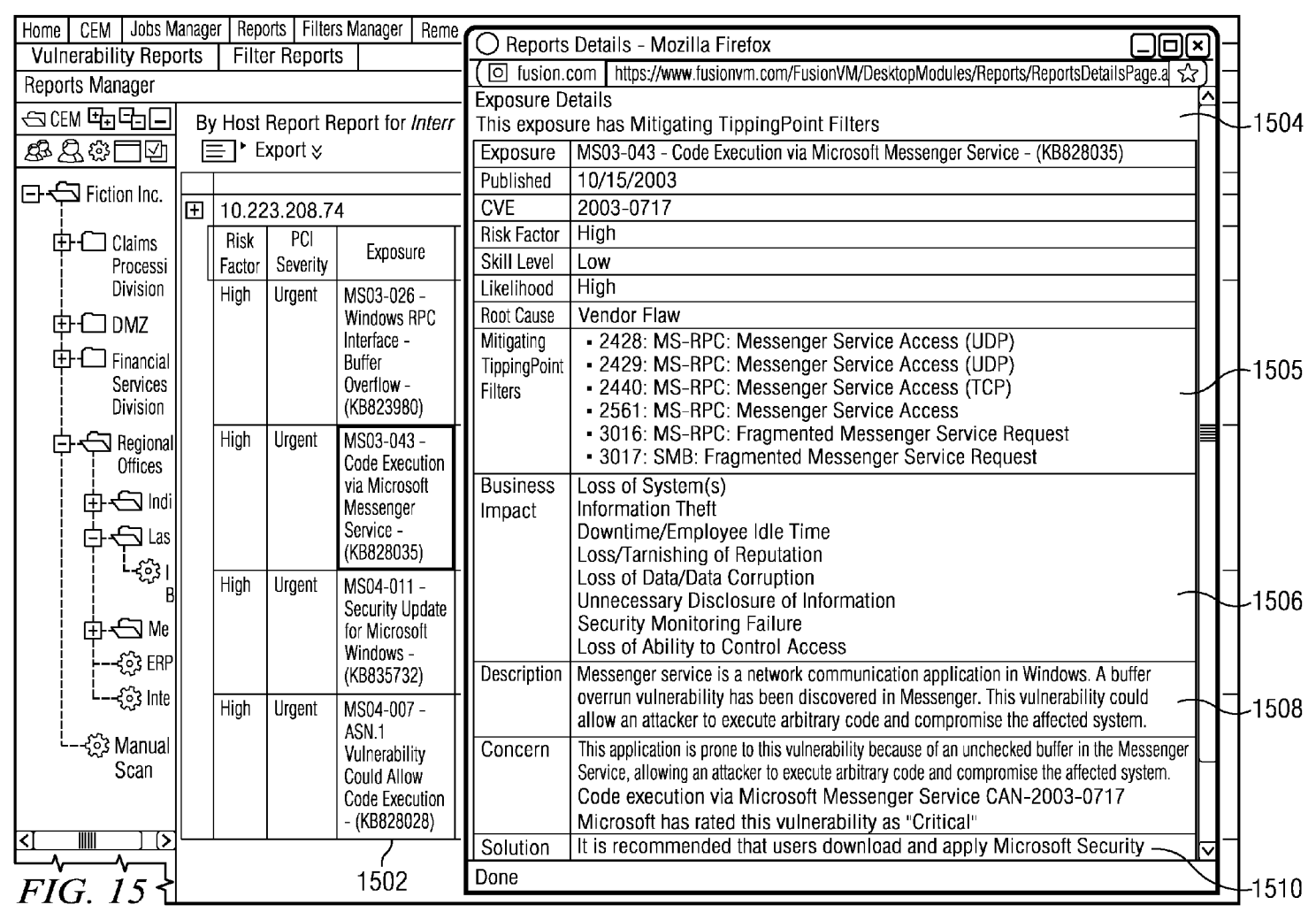

Referring now to FIG. 15, there is illustrated the host report associated with a particular node. The host report screen demonstrates the total mapped IPS filters for each vulnerability in database 408. By clicking on the standardized name of the vulnerability in the exposure column 1502, the exposure details window 1504 will be opened. The exposure details window 1504 lists the selected exposure name and provides information with respect to when the exposure was first detected, its risk level likelihood of this occurrence. 1505 shows the mitigating filters associated with the vulnerability. Additionally, the business impact section 1506 describes possible impacts upon the enterprise network. The descriptions field provides a short description of the vulnerability while the concern field 1508 describes issues with respect to the vulnerability. The solutions field 1510 provides potential solutions such as the above-illustrated filters which may be utilized in corrected and protection from the vulnerability.

Figure 16:
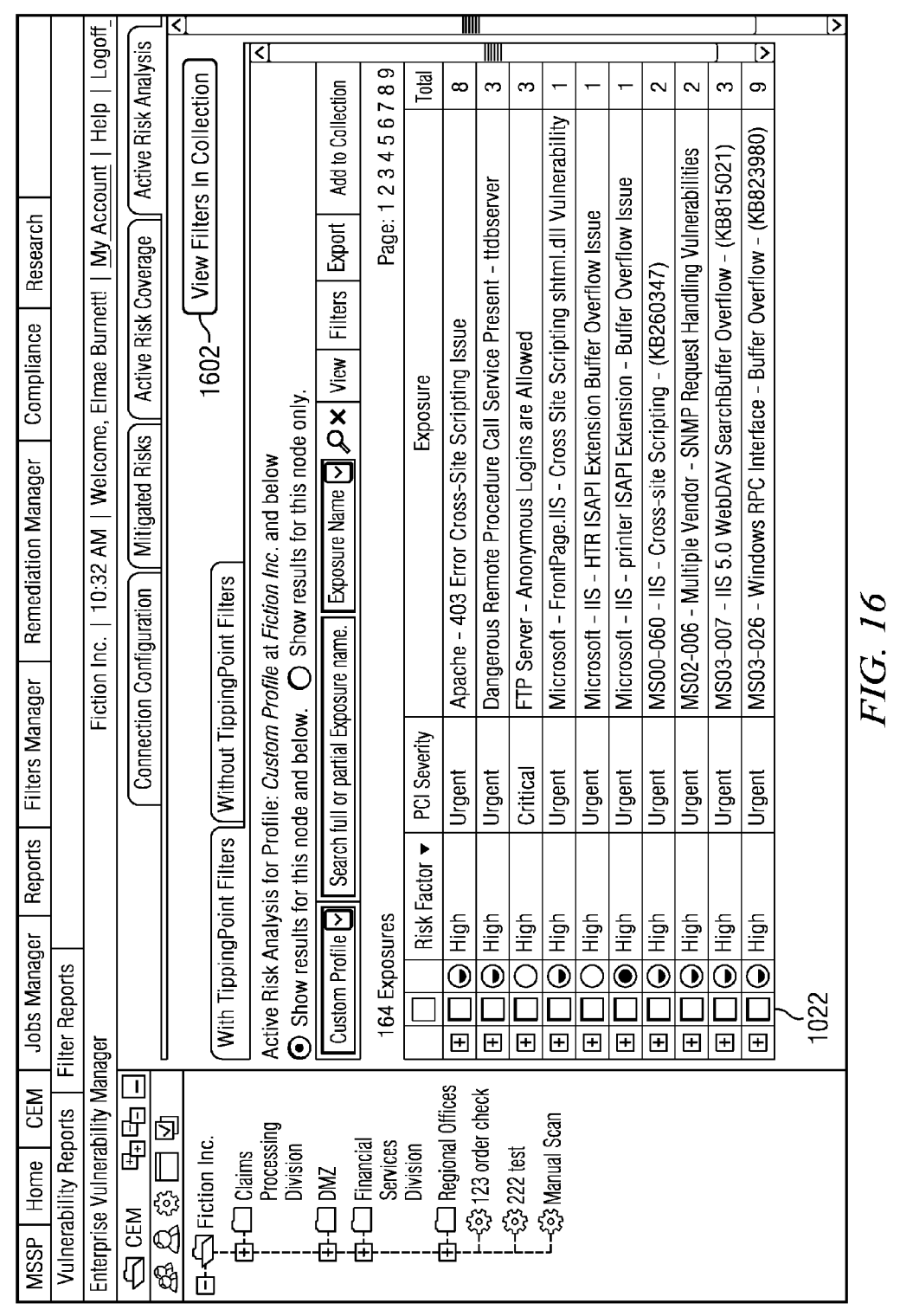
Figure 17:
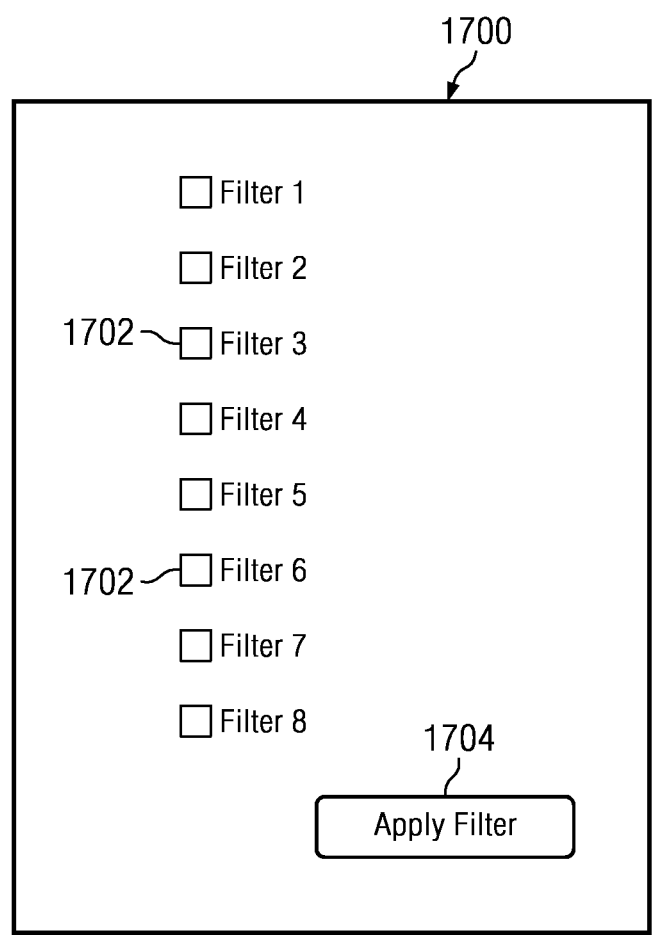
FIG. 17 illustrates a sub-window enabling selection and activation of filters with respect to a particular vulnerability.

Referring now to FIG. 16 the illustrated report is the active risk report, the details of which is described under FIG. 10 above, with the additional field 1602 for applying selected filters. By selecting filters in the filter column 1022 and clicking the "View Filters in Collection" field 1602, a list of filters associated with a vulnerability is displayed in a sub window 1700 as shown generally in FIG. 17. The user creates a list of filters they intend to activate on the SMS by selecting the filter for activation in field 1702. Once selected the user has the option to view the effects of proposed filter changes and then send the instructions to the SMS 314 for updating. The updating is initiated by activating a button 1704 to apply the filter changes through the SMS 314.

Thus, using the above-identified vulnerability to filter mapping system, a user may base their intrusion protection system filter selection based upon specific analysis of their system vulnerabilities and select only those filters which will provide the best benefit and protection from actual vulnerabilities within their system. Additionally, it enables the user to deactivate filters that provide no benefits to their systems for vulnerabilities that do not exist within their system. This provides optimization of bandwidth within the system while providing maximum protection to the enterprise network.

It will be appreciated by those skilled in the art having the benefit of this disclosure that this system and method for selecting filters within an intrusion protection system provides for tuning of intrusion protection filters responsive to detected vulnerabilities. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for controlling selection of filters for protecting against vulnerabilities of a computer network, comprising:
a vulnerability management system adapted to analyze the computer network and to determine network vulnerabilities for the computer network, wherein the vulnerability management system is configured to receive real-time data on a status of filters protecting against vulnerabilities of the computer network, wherein a filter comprises program code adapted to be implemented within an intrusion protection system to identify and prevent a particular type of attack from penetrating the computer network, the intrusion protection system being distinct from the vulnerability management system; and a database that contains a pre-generated mapping of network vulnerabilities to filters for protecting against the network vulnerabilities;

the vulnerability management system outputting one or more recommended actions for selection of filters for the intrusion protection system based upon the determined network vulnerabilities of the computer network, the pre-generated mapping of network vulnerabilities to the filters for protecting against the network vulnerabilities, and the real-time data on the status of the filters.

2. The system of claim 1, wherein the vulnerability management system generates one or more reports relating to the status of filters associated with the determined network vulnerabilities responsive to the determined network vulnerabilities, the database of mapped vulnerabilities to filters, and the real-time data on the status of the filters.

3. The system of claim 2, wherein the one or more reports include a mitigated risk report listing each of the determined network vulnerabilities that is protected from by an enabled filter responsive to the determined network vulnerabilities, the database of mapped vulnerabilities to filters, and the real-time data on the status of the filters.

4. The system of claim 2, wherein the one or more reports include an active risk report listing each of the determined network vulnerabilities that are at least partially unprotected from by one of the filters, further wherein the active risk report associates with each of the determined network vulnerabilities at least one filter that can protect from the determined network vulnerabilities and whether the at least one filter is enabled or disabled responsive to the determined network vulnerabilities, the database of mapped vulnerabilities to filters, and the real-time data on the status of the filters.

5. The system of claim 2, wherein the one or more reports include a list of determined network vulnerabilities that do not have an associated filter to protect from the vulnerability responsive to the determined network vulnerabilities, the database of mapped vulnerabilities to filters, and the real-time data on the status of the filters.

6. The system of claim 2, wherein the one or more reports include a mitigated risk report listing each of the determined network vulnerabilities that is protected from by an enabled filter responsive to the determined network vulnerabilities, the database of mapped vulnerabilities to filters, and the real-time data on the status of the filters and further wherein the determined network vulnerabilities in the mitigated risk report can be exempted from future mitigated risk reports.

7. The system of claim 1, wherein the vulnerability management system further includes an interface to a security management system controlling the filters of the intrusion protection system, the interface enabling provision of commands to the security management system relating the control of the filters for protecting against vulnerabilities of the computer network.

8. The system of claim 1, wherein the vulnerability management system further includes:

at least one scanning server for scanning for the network vulnerabilities within the computer network; and a vulnerability management server for receiving the determined network vulnerabilities from the scanning server and controlling the filters for protecting against the vulnerabilities of the computer network based upon the determined network vulnerabilities of the computer network, the database of mapped vulnerabilities to filters, and the real-time data on the status of the filters.

9. The system of claim 1, wherein the real-time data on the status of filters protecting against vulnerabilities of the computer network are provided from an intrusion protection system.

10. A method for controlling selection of filters for protecting against vulnerabilities of a computer network, comprising:

storing in a database a plurality of mapped network vulnerabilities of the computer network to filters for protecting against the network vulnerabilities, wherein a filter comprises program code adapted to be implemented within an intrusion protection system to identify and prevent a particular type of attack from penetrating the computer network;

determining network vulnerabilities for the computer network within a vulnerability management system executing in a computing entity having a hardware element;

receiving real-time data on a status of available filters protecting against vulnerabilities of the computer network at the vulnerability management system; and outputting one or more recommended actions for selection of filters for the intrusion protection system to protect against vulnerabilities of the computer network based upon the determined network vulnerabilities of the computer network, the mapped network vulnerabilities to the filters for protecting against the network vulnerabilities, and the real-time data on the status of the filters from the vulnerability management system.

11. The method of claim 10 further including the step of generating one or more reports relating to the status of the filters associated with the determined network vulnerabilities responsive to the determined network vulnerabilities, the mapped network vulnerabilities to filters, and the real-time data on the status of the filters.

12. The method of claim 11, wherein the step of generating reports further includes the step of generating a mitigated risk report listing each of the determined network vulnerabilities that is protected from by an enabled filter responsive to the determined network vulnerabilities, the mapped network vulnerabilities to filters, and the real-time data on the status of the filters.

13. The method of claim 11, wherein the step of generating reports further includes the step of generating an active risk report listing each of the determined network vulnerabilities that are at least partially unprotected from by one of the filters, the active risk report associating with each of the determined network vulnerabilities at least one filter that can protect from the determined network vulnerabilities and whether the at least one filter is enabled or disabled responsive to the determined network vulnerabilities, the mapped network vulnerabilities to filters, and the real-time data on the status of the filters.

14. The method of claim 11, wherein the step of generating reports further includes the step of generating a list of determined network vulnerabilities that do not have an associated filter to protect from the vulnerability responsive to the determined network vulnerabilities, the mapped network vulnerabilities to filters, and the real-time data on the status of the filters.

15. The method of claim 11, wherein the steps of generating reports further includes:

generating a mitigated risk report listing each of the determined network vulnerabilities that is protected from by an enabled filter in the intrusion protection system;

selecting determined network vulnerabilities to be filtered out from future mitigated risk reports; and exempting the selected vulnerabilities from the future mitigated risk reports.

16. The method of claim 10, wherein the step of controlling further comprises:

transmitting commands controlling the filters to a security management system from the vulnerability management system; and controlling the filters of at least one intrusion protection system for protecting against vulnerabilities of the computer network responsive to the commands to the security management system.

17. The method of claim 10, wherein the step of determining further comprises:

scanning for the network vulnerabilities within the computer network using a scanning server;

receiving the determined network vulnerabilities at a control server from the scanning server; and controlling the filters for protecting against the vulnerabilities of the computer network based upon the determined network vulnerabilities of the computer network, the mapped network vulnerabilities to filters, and the real-time data on the status of the filters.

18. The method of claim 10, wherein the step of receiving further includes receiving the real-time data on the status of filters protecting against vulnerabilities of the computer network from an intrusion protection system.

* * * * *